United States Patent [19]
Onodera

[11] Patent Number: 5,543,167
[45] Date of Patent: Aug. 6, 1996

[54] COOKED RICE FREEZING METHOD AND APPARATUS

[75] Inventor: Hirofumi Onodera, Nara-ken, Japan

[73] Assignee: Fujitetsumo Co., Ltd., Japan

[21] Appl. No.: 369,012

[22] Filed: Jan. 5, 1995

[51] Int. Cl.[6] .............................. A23L 3/00; F25D 25/00
[52] U.S. Cl. .................. 426/524; 62/63; 62/320; 62/380
[58] Field of Search ................................ 426/524, 518; 62/63, 320, 380

[56] References Cited

U.S. PATENT DOCUMENTS 4,367,596  1/1983  Onodera .................................. 34/147
4,607,495  8/1986  Fujimoto et al. ....................... 426/524

Primary Examiner—George Yeung
Attorney, Agent, or Firm—Townsend and Townsend and Crew

[57] ABSTRACT

Cooked rice is continuously fed rice at the entrance (6) of conveyor system (4) where the rice (a) is cooled to a chosen temperature using cool air jets from above and below the conveyor. The cooled rice is then transferred to another mesh conveyor (22) where cold air jets blow sub-freezing air onto the rice surfaces, but not the cores (a'), of the grains of rice are frozen and are covered with ice crystals (b). The surface-frozen rice is then transferred onto a third mesh conveyor (33) where two sets of counter-rotating comb rollers (32) break up the surface-frozen rice grains into separate grains of surface-frozen rice. The separate grains of surface-frozen rice is then transferred to a fourth mesh conveyor (42) where the grains of rice are completely frozen to the core.

19 Claims, 6 Drawing Sheets

COOKED RICE FREEZING METHOD AND APPARATUS

BACKGROUND OF THE INVENTION

This invention relates to a method for freezing cooked rice such that individual grains of frozen rice are created without damaging the grains or using oil to aid separation of the grains of rice.

The emergence of convenience foods, including frozen food, is no longer limited to a narrow range of foods. One of the foods which is now commonly frozen is cooked rice. Freezing cooked rice has some inherent problems. If the rice is frozen in a mass, such as for an individual serving, the mass of frozen cooked rice is commonly defrosted with hot water or is microwaved. In either case, the rice seems to get defrosted unevenly and the resulting product is not nearly as appetizing as is freshly cooked rice. Also, when rice is frozen in a mass, it is difficult to separate the rice into measured amounts; this causes problems in packaging conventionally frozen cooked rice. Therefore, it is preferred that the frozen rice be individual, separate grains of frozen rice rather than a mass of frozen rice.

One way to create separate grains of frozen cooked rice is disclosed in several reports: Junkaisho Official Reports 57-65156 through 57-65157; 57-99148; and 60-227640. These reports teach cooling cooked rice down to a chosen temperature, typically room or ambient temperature, and then freezing the rice which creates a frozen mass of rice. The frozen mass of rice is then broken up into pieces with the purpose of having individual frozen grains of rice the result. One of the problems with this method is that in breaking up the frozen mass of rice, many rice grains are crushed or smashed resulting in lower quality rice.

In response to the problems caused by the smashed rice grains, oil can be mixed into the cooked rice before freezing. By coating the surface of each grain of rice with oil, the grains of rice after freezing break into separate grains very easily thus resulting in much less damage to the rice. However, adding oil to the rice is not desirable since it changes the taste and texture of the rice. Therefore, this method cannot be used with plain white rice; the method is only suitable for flavored rice or other situations where the taste of the oil would not be objectionable.

SUMMARY OF THE INVENTION

The present invention eliminates the problems of the prior art in which the grains of rice are damaged when the frozen mass of rice is broken up into individual pieces or grains or adulterated by the adding of oil to coat the grains of rice. The invention rapidly freezes the cooked rice only to the point that the outside surface of the grains of rice freeze thus forming a layer of ice surrounding each grain. The surface-frozen rice is then passed to a station where the mass of surface-frozen rice is broken up into separate surface-frozen grains of rice. Since the rice is not frozen to its core, it has been found that very little damage is done to the individual grains of rice during this breaking up step; that is, the grains do not undergo the smashing, crushing or other deformation which has occurred with prior art methods. The surface-frozen grains of rice are then transferred to a final freezing station where the grains of rice are fully frozen to the core. The frozen grains of rice then exit the system for packaging.

To best preserve product freshness, it is preferred that freshly cooked rice be delivered to a cooling station at which cooling equipment cools the rice down to a chosen temperature, typically the ambient temperature. This preferably occurs by directing the cooked rice onto a net or mesh conveyor having rows of cool air jets above and below the conveyor so to direct cooling air onto the rice from above and below.

A preferred way of rapidly freezing the rice includes delivering the cooled rice to a mesh or net conveyor which passes between rows of cold air jets which deliver subfreezing air to the rice from above and below. The rapid freezing station is set up, however, so not to completely freeze the rice to the core of each grain of rice but only freeze the surface to create a layer of frozen water about each grain of rice.

In the preferred embodiment the surface-frozen rice is broken up into grains of surface-frozen rice at a breaking up station including a pair of counter-rotating comb rollers. The frozen mass of rice is broken up as the rice passes beneath the comb rollers. A second set of comb rollers having more closely spaced comb elements or teeth can be used downstream of the first pair.

The primary advantage of the invention is that since only the surfaces of the grains of rice are initially frozen so the cores of the grains of rice remain unfrozen, subsequent breaking up of the surface-frozen rice does very little damage to the grains of rice, unlike the prior art methods which tend to crush and smash the rice grains.

Other features and advantages of the invention will appear from the following description in which the preferred embodiment has been set forth in detail in conjunction with the accompanying drawings.

DESCRIPTION OF THE PREFERRED EMBODIMENT

Figure 1:
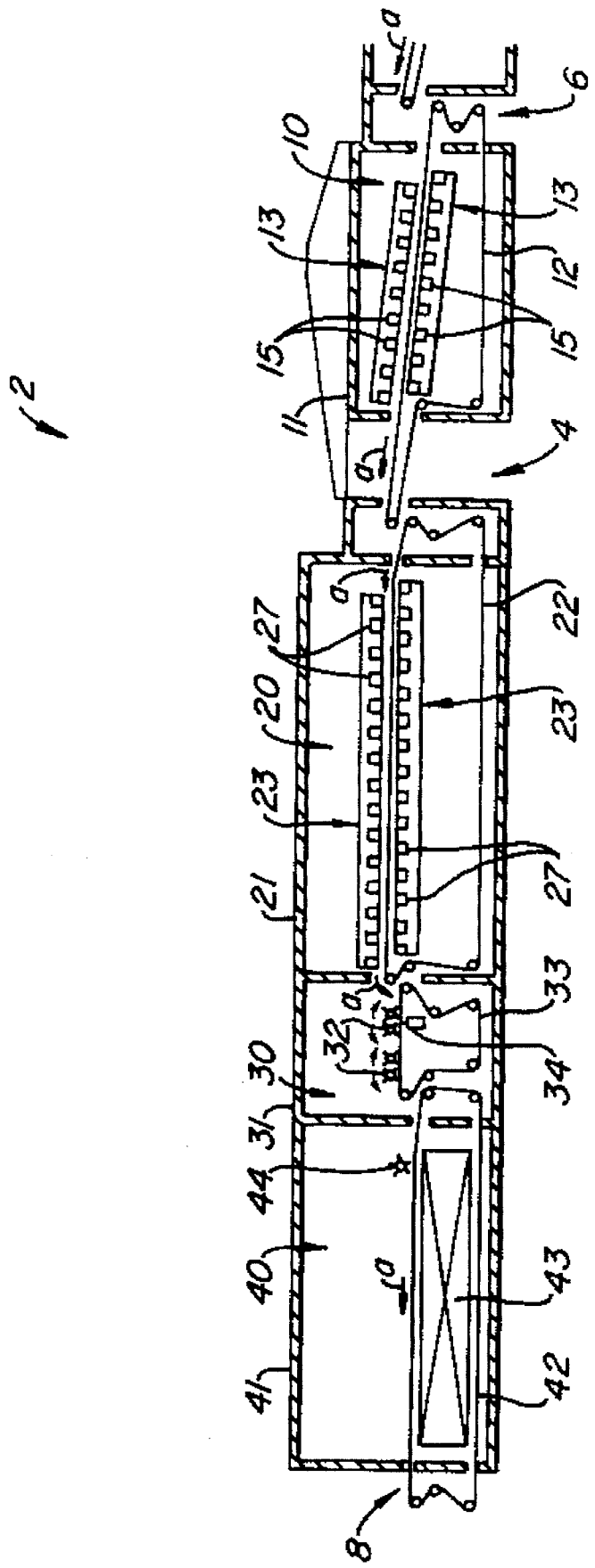
FIG. 1 is an overall schematic view of a rice freezing apparatus made according to the invention.

FIG. 1 illustrates a rice freezing apparatus 2 made according to the invention. Apparatus 2 includes a conveyor system 4 having a conveyor entrance 6 and a conveyor exit 8. Apparatus 2 includes cooling equipment or station 10 which cools down cooked rice a to a chosen, typically ambient, temperature, rapid freezing equipment or station 20 which rapidly freezes the surface of the grains of rice, breaking up equipment or station 30 which breaks the surface-frozen rice into pieces or grains, and finally the full freezing equipment or station 40 which completely freezes the grains of surface-frozen rice.

Figure 2:
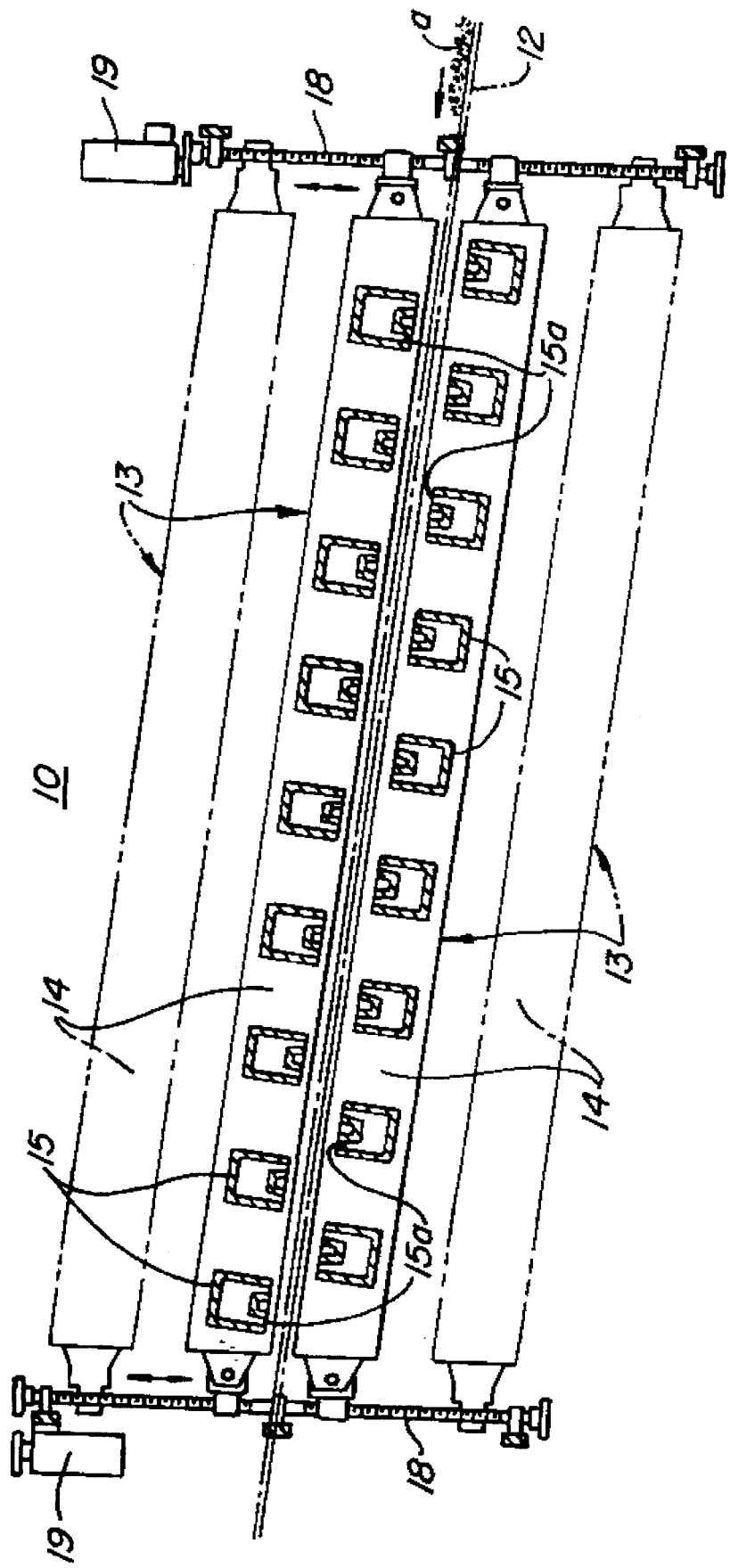
FIG. 2 is an enlarged view of the cooling equipment of FIG. 1.
Figure 3:
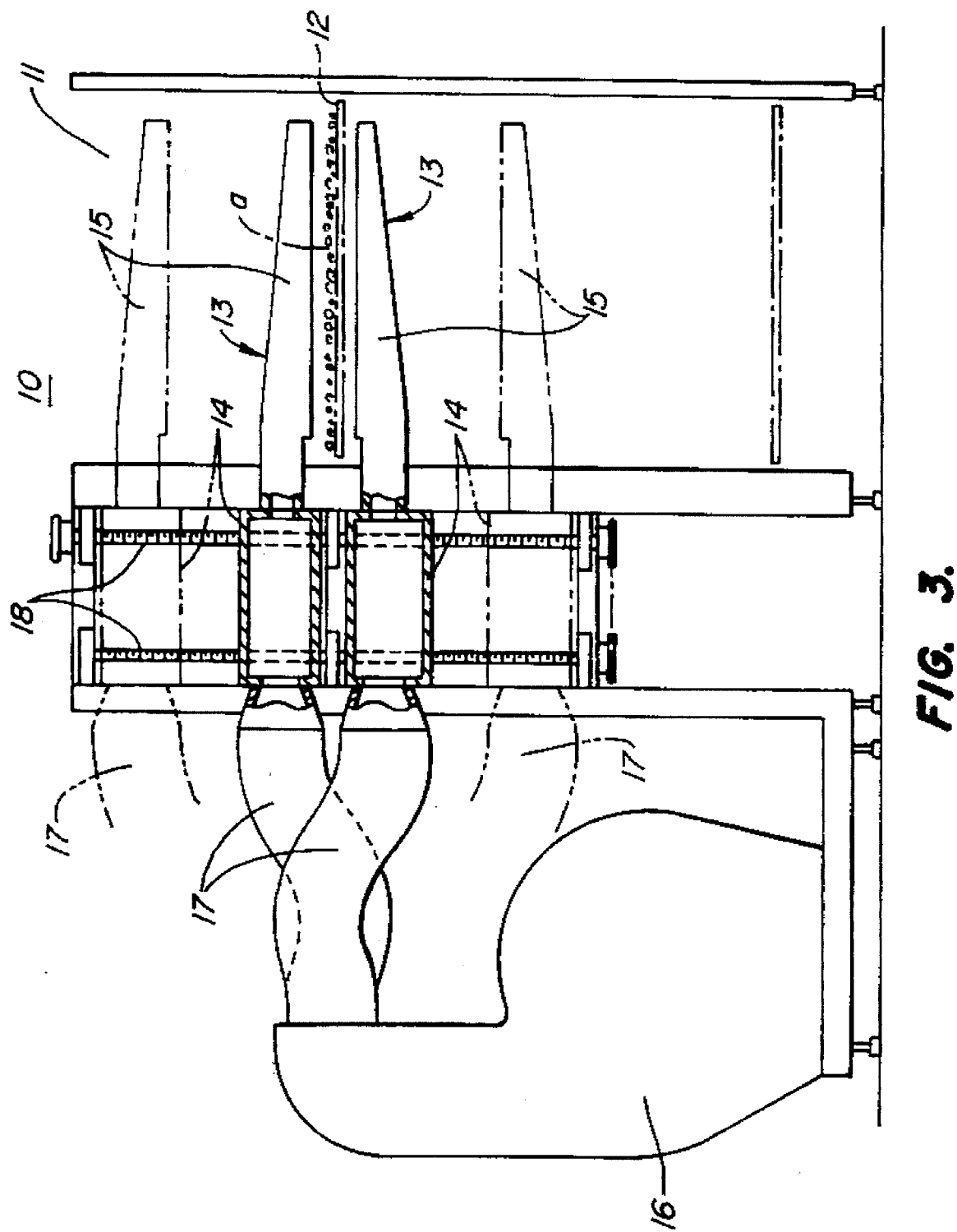
FIG. 3 is a side view of the cooling equipment of FIGS. 1 and 2 showing a fan and flexible air piping connected to the cooling units.

FIGS. 1 and 2 illustrate a net or mesh conveyor 12 installed in an insulated room 11. Cooling units 13 are installed above and below net conveyor 12. Each cooling unit has a common chamber 14 supplied with air by a fan 16 through flexible air piping 18 as shown in FIG. 3. Each cooling unit also includes jet nozzles 15 extending from common chambers 14 with adjustable sizes opening 15a over the entire length of nozzles 15.

As seen in FIGS. 2 and 3, chambers 14 are supported by screw shafts 18 having right-hand threads on one side of net conveyor 12 and left-hand threads on the other side. Rotating screw shafts 18 by motors 19 causes chambers 14, and thus cooling units 13 therewith, to move between the solid line and phantom line positions of FIGS. 2 and 3. This permits the proper distance to be maintained between cooling units 13 and net conveyor 12. It also permits adjustable-size openings 15a in jet nozzles 15 to be easily cleaned. Net conveyor 12 can also be washed, typically by water spray, even during operation of the unit. Air from fan 16 can be ambient air or can, as is preferable, pass through a cooler, not shown, and cooled to about 35° C. to achieve the desired cooling of cooked rice a.

Jet nozzles 15 and adjustable size openings 15a extend across the entire width of net conveyor 12. The adjustable size of openings 15a permit adjustment of the air flow and thus the cooling of the rice as it passes along conveyor 12. Since air is directed to rice a from both above and below, cooling of the rice is quite uniform and quick. The chosen temperature to which it is desired to cool the rice in cooling station 10 is preferably about ambient temperature, that is approximately 20° C. to 23° C. If desired, rice a could be cooled to a higher or lower temperature.

Figure 4:
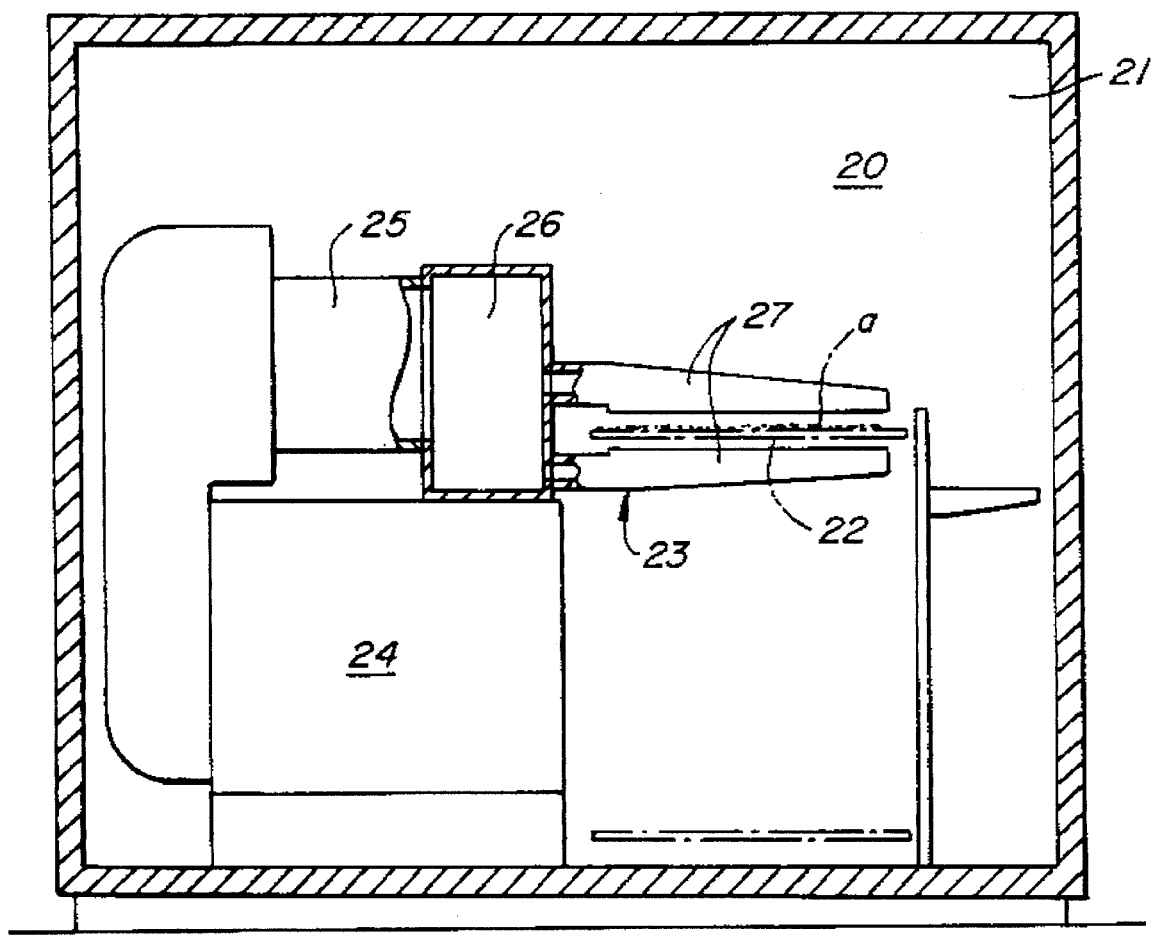
FIG. 4 is an enlarged side view of the rapid freezing equipment of FIG. 1.
Figure 6:
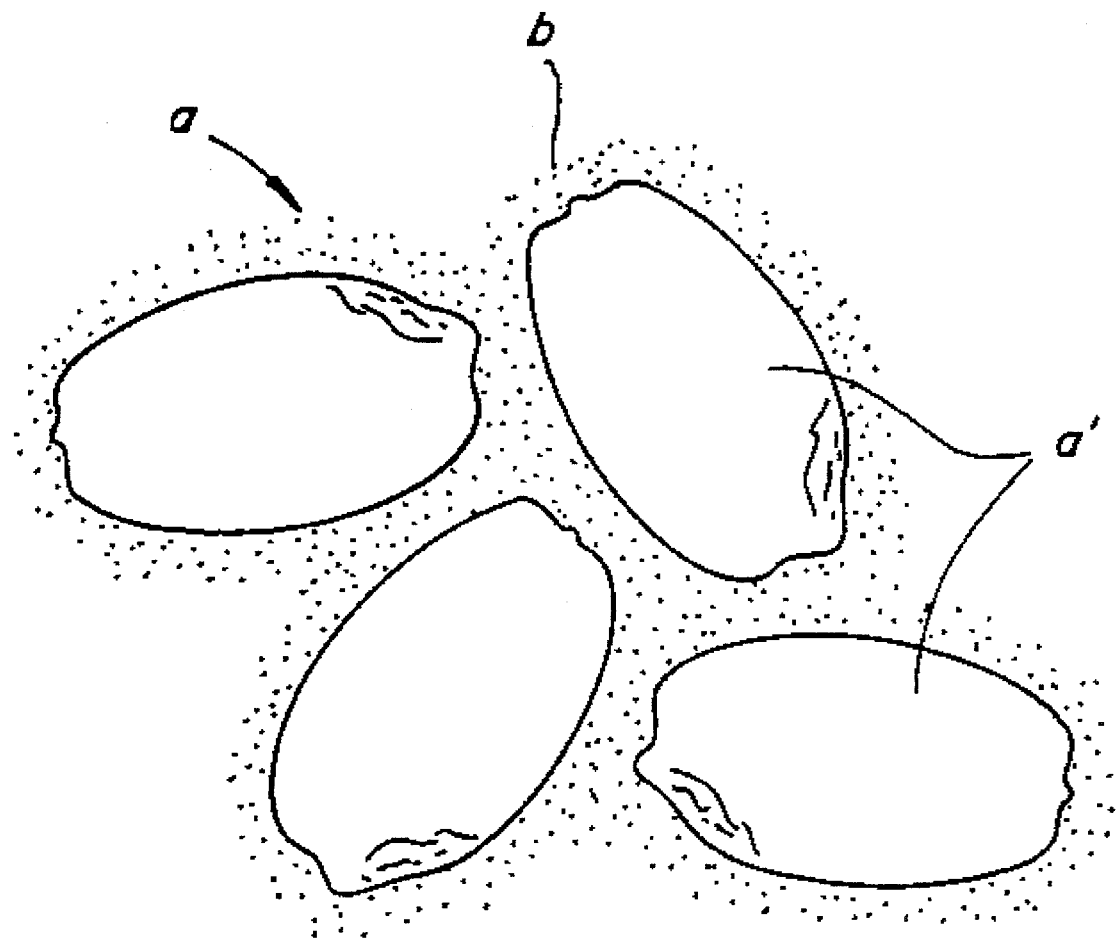
FIG. 6 is an enlarged view showing individual rice grains covered by rice crystals constituting layers of ice about the grains.

Rapid freezing station 20, as shown in FIGS. 1 and 4, includes an air permeable, mesh or net conveyor 22 installed in an insulated room 21. Jet nozzles 27, similar to jet nozzles 15, of a freezing unit 23 are installed above and below net conveyor 22. Freezing unit 23 includes jet nozzles 27, a cooler 24, a fan 25 and a chamber 26 which acts as a common plenum for the jet nozzles. They are all clearly shown in FIG. 4. Jet nozzles 27 are also able to move up and down in a manner similar to jet nozzles 15. Air at about −40° C. is sent from cooler 24 by fan 25 through chamber 26 to jet nozzles 27. This subfreezing air is blown onto the top and bottom of net conveyor 22. This very cold air rapidly freezes the surfaces of grains of rice a. The moisture on the surface of the rice grains freezes so that the rice grains are flocked or covered by ice crystals b before the cores a' of rice grains a become frozen. See FIG. 6. The speed of transport of the rice through rapid freezing station 20, the volume of air, the temperature of air, the thickness of the layer of rice a on conveyor 22 can all be controlled to ensure that ice crystals b form while the core a' of the grains of rice a remain unfrozen.

Figure 5:
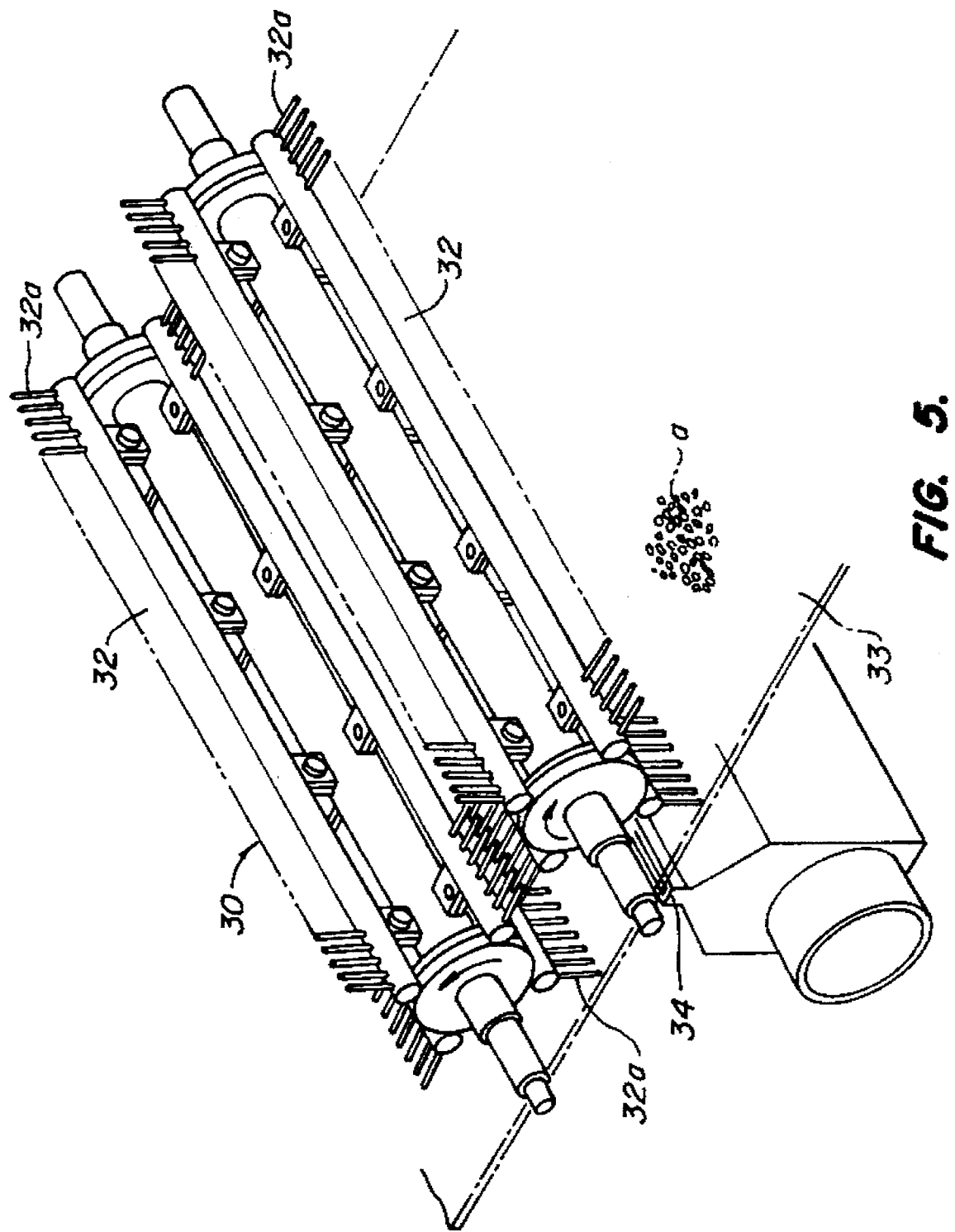
FIG. 5 is an enlarged isometric view of a portion of the breaking up equipment of FIG. 1.

Breaking up equipment 30 includes a pair of counter-rotating comb rollers 32 housed within an insulated room 31. See FIGS. 1 and 5. Comb rollers 32 include outwardly radially extending comb elements 32a, typically radially extending metal rods, which engage and break up the mass of surface-frozen rice grains moving to comb rollers 32 while being supported on a mesh or net conveyor 33. Breaking up station 30 also includes a cool air jet nozzle 34 situated beneath net conveyor 33 and between comb rollers 32. Nozzle 34 helps to reposition and spread out surface-frozen rice grains a before such rice engages the next comb roller 32. Thus, comb rollers 32 act to break up rice grains a into separate, ice-coated rice grains. This occurs with very little crushing, smashing or other damage to the grains of rice 2' since cores a' of the rice grains are not frozen at this point.

FIG. 1 shows a second set of comb rollers 32 downstream from the set overlying cool air jet nozzle. This second set of comb rollers preferably has more closely spaced comb elements 32a to in aid breaking up all the surface-frozen rice into separate grains of surface-frozen rice.

The separated surface-frozen grains of rice a then pass from breaking up station 30 to full freezing station by being deposited on a mesh or net conveyor 42. Station 40 includes an insulated room 41 through which conveyor 42 passes. Cold air at about −35° C. circulates within room 40 using a cooler 43 to completely freeze the now-separated grains of rice a. That is, cores a' of rice grains a are frozen at full freezing station 40. A pin roller 44 is positioned above net conveyor 42 and is used to spread rice grains a evenly over the conveyor.

The equipment use with apparatus 2 is made from materials suitable for use in the food industry, such as stainless steel for the net conveyors 12, 22, 33, 42, jet nozzles 15, 27, 34 and insulation rooms 11, 21, 31, 41. Other food-grade materials can also be used.

In use, cooked rice a, preferably directly from a rice cooker, is continuously fed to the entrance 6 of conveyor system 4, that is onto a net conveyor 12. Rice a is then cooled to a chosen temperature within cooling station 10. The cooled rice is then transferred to net conveyor 22 so that the rice is quick frozen within rapid freezing station 20. At station 20 rice a has its surface, but not its core, frozen and has its surface covered with ice crystals b. The surface-frozen rice a is then transferred onto net conveyor 33 at breaking up equipment station 30. Two sets of counter-rotating comb rollers 32 break up the surface-frozen rice grains a into separate grains of surface-frozen rice. The separate grains of surface-frozen rice is then transferred to net conveyor 42 and the grains of rice are completely frozen to the core within full freezing station 40. The fully frozen, separated grains of rice exit rice freezing apparatus 2 at exit 8 for continued processing, typically packaging.

Modification and variation can be made to the disclosed embodiment without departing from the subject of the invention as defined in the following claims. For example, while the invention is discussed in terms of a continuous process, the aspect of the invention in which the cooked rice is first surface-frozen, then broken into individual grains of surface-frozen rice and then completely frozen to the core can be accomplished as a batch process. Air permeable conveyors other than mesh or net conveyors could be used. Mechanical devices for breaking up the surface-frozen grains of rice can be accomplished by using equipment other than counter-rotating comb rollers.

What is claimed is:

1. A method for freezing cooked rice comprising the following steps:

rapidly freezing the surfaces of the grains of the cooked rice to create surface-frozen rice with layers of ice about the grains of rice while maintaining the cores of said grains of rice in a substantially unfrozen state;

breaking up the surface-frozen rice into separate grains of surface-frozen rice; and cooling the separated grains of surface-frozen rice to freeze the cores of the grains of rice so said grains of rice become completely frozen.

2. The rice freezing method according to claim 1 further comprising the following step prior to the rapidly freezing step:

lowering the temperature of the cooked rice to a chosen temperature above freezing.

3. The rice freezing method according to claim 2 wherein the temperature lowering step is carried out by conveying the cooked rice on an air-permeable conveyor and blowing ambient air onto the cooked rice from above and below the air-permeable conveyor.

4. The rice freezing method according to claim 2 wherein the temperature lowering step is carried out by lowering the temperature of the cooked rice to about the ambient air temperature.

5. The rice freezing method according to claim 1 wherein the rapidly freezing step is carried out by conveying the cooked rice on an air-permeable conveyor and blowing sub-freezing air onto the cooked rice from above and below the air-permeable conveyor.

6. The rice freezing method according to claim 1 wherein the breaking up step is carried out using first and second counter-rotating comb rollers situated above a conveyor on which said surface-frozen rice is supported.

7. The rice freezing method according to claim 6 wherein the breaking up step is carried out using an air-permeable conveyor on which said surface-frozen rice is supported.

8. The rice freezing method according to claim 7 wherein the breaking up step includes the step of blowing air up through said air-permeable conveyor so to spread said surface-frozen rice over said air-permeable conveyor.

9. Apparatus for freezing cooked rice comprising:
   means for rapidly freezing the surfaces of grains of the cooked rice so as to create surface-frozen rice with layers of ice about the grains of rice while maintaining the cores of the grains of rice in a substantially unfrozen state;
   means for breaking up the surface-frozen rice into separate grains of frozen rice; and
   means for cooling the separated grains of surface-frozen rice to freeze the cores of the grains of rice so said grains of rice become completely frozen.

10. The freezing apparatus of claim 9 further comprising means for lowering the temperature of the cooked rice to a chosen temperature above freezing.

11. The freezing apparatus of claim 9 wherein the rapidly freezing means includes an air-permeable conveyor supporting the rice and cold air jets positioned above and below the air-permeable conveyor.

12. The freezing apparatus of claim 11 wherein the air-permeable conveyor is a mesh conveyor.

13. The freezing apparatus of claim 11 further comprising means for adjusting the distances the cold air jets are from the air-permeable conveyor.

14. The freezing apparatus of claim 9 wherein the breaking up means includes a conveyor and a pair of counter-rotating comb rollers positioned above the conveyor, the comb rollers having outwardly extending comb elements which contact the surface-frozen rice.

15. Apparatus for freezing cooked rice comprising:
   a conveyor system having a conveyor line with an entrance for accepting the cooked rice and an exit for discharging frozen rice;
   a rapid freezing station at a first segment of the conveyor line including a freezing unit positioned along the first segment;
   the freezing unit including cold air jets positioned to blow sub-freezing air onto the cooked rice so as to freeze the outside surfaces of the grains of rice to create surface-frozen rice and create layers of ice about the surfaces of the grains of rice while leaving the cores of the grains of rice substantially unfrozen;
   a surface-frozen rice breaking-up station at a second segment of the conveyor line including a breaking-up element which engages the surface-frozen rice and breaks the surface-frozen rice into individual grains of surface-frozen rice; and
   a full-freezing station at a third segment of the conveyor line, said second segment being between the first and third segments and the third segment being between the second segment and the exit, said full-freezing station including a cooler which completely freezes the separated surface-frozen grains of rice.

16. The apparatus according to claim 15 further comprising a rice cooling station along a fourth segment of the conveyor line between the first segment and the entrance.

17. The apparatus according to claim 15 wherein the breaking-up elements include counter-rotating comb rollers.

18. The apparatus according to claim 15 wherein the rapid freezing station includes first and second freezing units positioned above and below the first segment of the conveyor line.

19. The apparatus according to claim 18 wherein the first segment of the conveyor line is air-permeable.

* * * * *